R. SYMMONDS, Jr.
SELECTIVE CONTROLLER.
APPLICATION FILED AUG. 22, 1907.
917,973.
Patented Apr. 13, 1909.
2 SHEETS—SHEET 1.
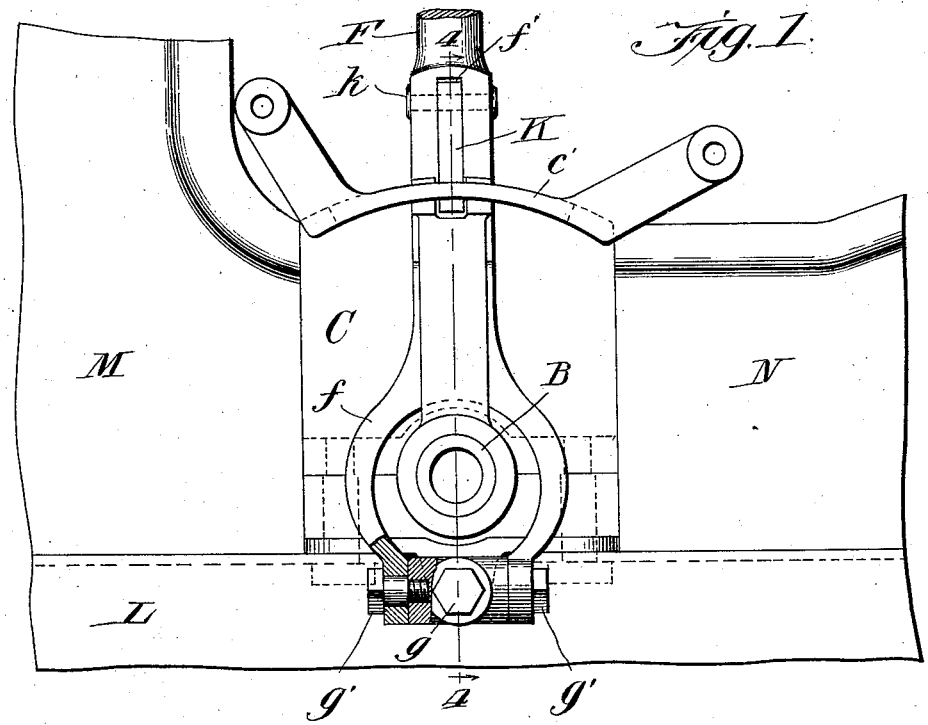
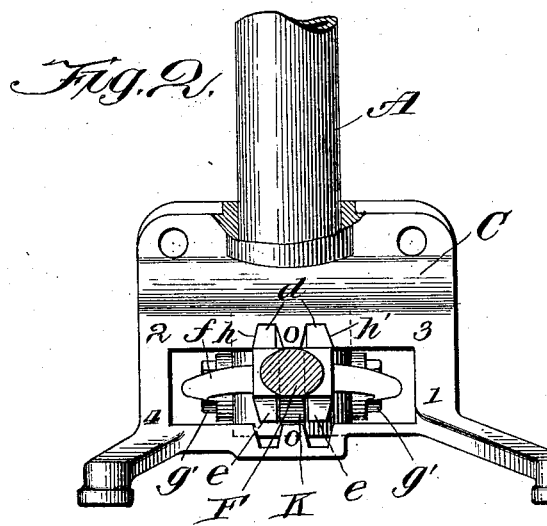
Witnesses:
Harry S. Gaither
Ruby V. Nash.
Inventor:
Robert Symmonds Jr.
by Walter H. Chamberlin
his Att'y

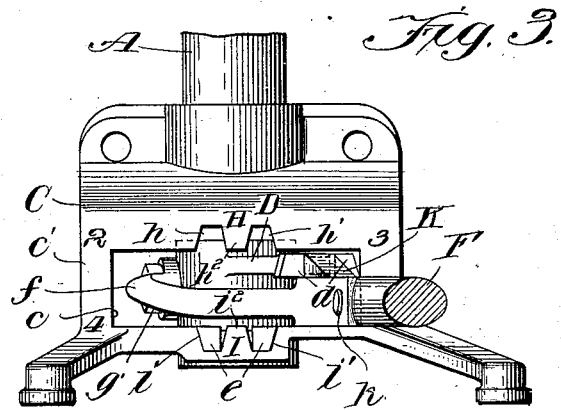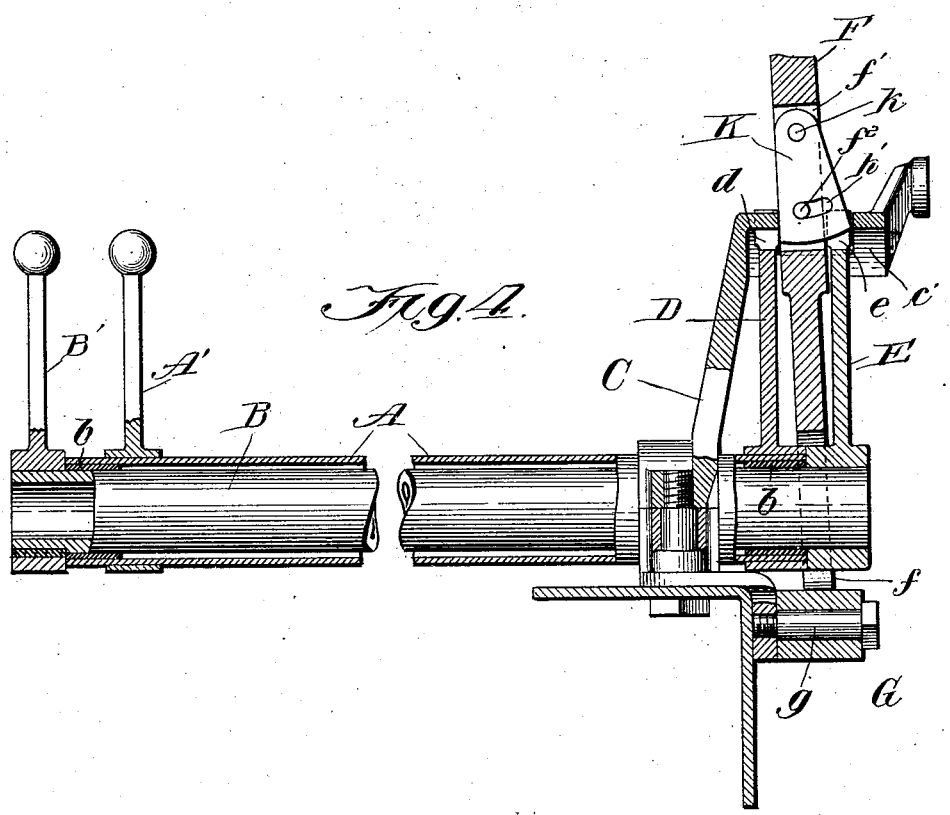

UNITED STATES PATENT OFFICE.

ROBERT SYMMONDS, JR., OF KENOSHA, WISCONSIN, ASSIGNOR TO THOMAS B. JEFFREY, OF KENOSHA, WISCONSIN.

SELECTIVE CONTROLLER.

No. 917,973.          Specification of Letters Patent.          Patented April 13, 1909.

Application filed August 22, 1907. Serial No. 389,629.

*To all whom it may concern:*

Be it known that I, ROBERT SYMMONDS, Jr., a citizen of the United States, residing at Kenosha, county of Kenosha, State of Wisconsin, have invented a certain new and useful Improvement in Selective Controllers, and declare the following to be a full, clear, and exact description of the same, such as will enable others skilled in the art to which it pertains to make and use the same, reference being had to the accompanying drawings, which form a part of this specification.

My invention relates to controlling devices, particularly those for governing the operation of mechanisms wherein it is desired to produce varying conditions through the shifting of a single lever or other movable element, and it has for its object to improve such devices.

In automobiles, for example, it is customary to place between the engines and the driving wheels transmission devices which will permit the automobiles to be propelled in the forward direction at various speeds and to be reversed without altering the speed or direction of rotation of the engine shafts; it being of course necessary to provide means within reach of the operators of the automobiles for governing the transmission devices. In one of its aspects my invention may be regarded as comprising a simple, neat and reliable controller for such transmission devices; the controller being so arranged as to be easily manipulated, positive in its action, and not apt to get out of order under any conditions of service to which it may be subjected.

In carrying out my invention I make use of a pair of telescoped shafts for controlling the transmission devices, together with an operating lever for the shafts and means controlled by a single lateral movement of the lever in one direction or the other, when in its neutral position, for rigidly connecting either shaft (depending upon the direction of the lateral movement) to the lever and at the same time locking the other shaft in a fixed, inoperative position. My invention, in a further aspect, may therefore be regarded as comprising a lever, a pair of elements adapted to be moved by the lever, and means controlled by a simple initial movement of the lever for causing the lever to act selectively upon said elements so as to cause one of the elements to be moved while the other is positively locked against movement.

The various features of novelty by which my invention is characterized will be hereinafter pointed out with particularity in the claims; but for a full understanding of my invention, in those of the aspects enumerated and its other aspects, reference is to be had to the following detailed description, taken in connection with the accompanying drawings, wherein—

Figure 1 shows in side elevation a portion of an automobile having applied thereto a device arranged in accordance with the preferred form of my invention; Fig. 2 is a plan view of the device shown in Fig. 1, detached from the automobile, the operating lever being in a neutral position; Fig. 3 is a view similar to Fig. 2, showing the operating lever in a working position; and Fig. 4 is a section taken on line 4—4 of Fig. 1.

In the drawings I have illustrated my invention as applied to an automobile, where it is employed to operate the transmission device, particularly one of the selective type. It will, of course, be understood, however, that although this is one of the situations in which my invention may be used to great advantage, the invention is not limited to this particular field.

Referring to the drawing, A and B indicate two telescoped shafts, the shaft A surrounding the shaft B and being supported thereon in any suitable manner, as by means of bushings *b* arranged at opposite ends of the shaft A between the interior thereof and the exterior of shaft B. The inner shaft is longer than the outer one, so that both of its ends project beyond the ends of the outer shaft. On one end of the shaft B is rigidly secured an arm B', while upon the corresponding end of the shaft A is secured a similar arm A'; these two arms being intended to be connected with the transmission device in any usual manner. The opposite ends of the two shafts project through a bearing within a casing or bracket C, the bearing being so fitted that the shafts may be rotated within it and also reciprocated axially. Rigidly connected to these ends of the shafts are two rigid arms D and E respectively. The arms B' and E upon the two ends of the inner shaft may be arranged in close proximity to the ends of the outer shaft, and thus act as collars or stops to prevent relative axial movements between the two shafts. These arms do not, however, prevent relative rotary movements between the shafts, but the shafts are left entirely free to rotate independently of each other, the shaft A rotating within the bearing in the member C and the shaft B rotating within the shaft A.

In the arrangement illustrated, it is intended to effect four different conditions by means of the two shafts, viz: by oscillating the outer shaft so as to move the arm A' to one side or the other of its neutral position a high or intermediate speed in the forward direction may be obtained, and by oscillating the shaft B in the same manner a slow speed in a forward direction or a reverse movement of the automobile may be obtained.

The present invention contemplates an arrangement whereby a single lever, such as F, may be employed to positively operate the shafts in the desired directions, and, at the same time, provide a positive interlock so as to obviate all danger of interference between the various members of the transmission device. To the above end, the lever is pivoted to the frame or bracket C at a point adjacent the ends of the shafts to which the arms D and E are secured, but on the side of these shafts opposite that on which the arms D and E are located. A convenient form of pivotal connection for the lever consists in providing a block G, which is pivotally supported upon the member C directly beneath the ends of the shafts by means of a stud or bolt $g$, which is arranged parallel with the axis of the shafts. The lever, which is forked at its lower end as at $f$, so as to surround the shafts without touching them, is pivotally connected to the ends of the block G by means of studs or bolts $g'$, which are arranged at right angles to the stud or bolt $g$. In this way the lever is free to oscillate in two planes at right angles to each other, viz: in a plane at right angles to the axis of the shafts and in a plane parallel with the axis of the shafts. The parts are so arranged that the lower end of the lever is located between the two arms D and E, and substantially fills the space between the upper ends of these arms. It will therefore be seen that by oscillating the lever about the pivots $g'$, viz: in the plane parallel to the axis of the shafts, the arms D and E are carried in one direction or the other, depending upon the direction of oscillation, and the two shafts are given a corresponding movement. By placing the pivots of the lever below the shafts, a considerable lateral movement of the arms D and E may be effected, without an unnecessarily large lateral movement of the upper end of the lever; this being, of course, desirable where the device is used on an automobile. The upper ends of the arms D and E, as well as the lever arranged between them, extend through a slot $c$ in the segmental portion $c'$ of the bracket. This slot limits the oscillation of the lever in both directions, and also the movements of the arms D and E. The movement of the arms in the axial direction is made use of to lock one of the arms to the fixed bracket and at the same time lock the other arm to the lever. Thus either of the arms can be oscillated so as to rotate its corresponding shaft through a predetermined angle in either direction, but while this is taking place the other arm will be positively locked in its normal inoperative position.

The slot in the bracket is made of a width less than the distance across the upper ends of the arms, so that both arms cannot at the same time oscillate about their common axis. In order that either of the arms may be oscillated and the other held stationary, I provide alined recesses H and I in the opposite sides of the slot intermediate the ends thereof. These recesses are of such size and shape that when the lever F is oscillated toward the left (referring to Fig. 4) the upper end of the arm D will enter the slot H and be held thereby against appreciable displacement lengthwise of the slot. The parts are so proportioned that when the arm D is fully seated within the recess H the arm E is free to move back and forth lengthwise of the slot. Similarly when the lever is oscillated in the opposite direction the arm E is introduced into the recess I and the arm D is freed from the other recess. The arm D may now be oscillated within the slot while the arm E remains stationary.

In order that the lever may positively move either arm in one direction or the other from the neutral position, some means must be provided for locking it to the selected arm at the same time that the other arm is locked to the bracket. To this end I have provided a dog K supported upon the lever so as to be movable transversely thereof, and of a length greater than the thickness of the lever. In fact, the length of the dog is preferably about equal to the width of the guiding slot. This dog may take any desired form and be supported in a desired way, it being conveniently pivoted within a slot $f'$ in the lever as at $k$ and having its angular movement upon the lever limited by a pin $f^2$ and a slot $k'$. What has been termed the length of the dog is therefore the width of the pivoted member adjacent its lower end. The upped end of each of the arms D and E is forked so as to provide jaws $d$ and $e$ respectively, these jaws being of such size and shape as to be capable of receiving and holding one end of the dog. Moreover, each of the recesses H and I, instead of being continuous, is preferably made in two parts, as at $h$, $h'$, and $i$, $i'$, so as to leave projections $h^2$ and $i^2$, respectively, between the two portions of each recess. These projections are narrow enough to be received by the jaws $d$ and $e$ so as not to interfere with the movements of the upper ends of the arms D and E into the recesses.

The function of the projections $h^2$ and $i^2$ is evident, viz: When the lever is in its neutral position and the upper ends of the two arms are in alinement with the recesses, an oscillation of the lever in one direction or the other in the plane parallel to the axis of the shafts not only forces one of the arms into the corresponding recess but, by reason of the engagement of the projection within such recess with one end of the dog, the opposite end of the dog is forced into the jaw of the arm which is clear of its recess; therefore the latter arm is positively locked to the lever and cannot be unlocked therefrom until the lever is again returned to the neutral position. Furthermore, the arm which has been left within one of the recesses cannot be released therefrom until the lever has been returned to the neutral position and is given the proper releasing movement. In this way all interference between the shafts A and B and the parts controlled thereby is made impossible.

In Fig. 2 the parts are shown in their neutral positions, viz: the lever is at the position marked zero on the segment. The lever has been oscillated so as to bring the arm D into engagement with the recess H and therefore the arm E may be oscillated by manipulating the lever within the limits of the slot in the bracket. The lever may be oscillated in either direction from the neutral position. If it is moved toward the right to bring the arm E to the position marked 1, the automobile will be propelled forward at a slow rate of speed. If, on the other hand, the lever is moved toward the left so as to bring the arm E to the position marked 4, the direction of travel of the automobile will be reversed. It will be seen that there can be no interference between the slow speed forward and the reverse mechanisms, since the arm B' which controls them must be moved positively from one extreme position to the other to effect a change.

If it is desired to run at a high or an intermediate speed in the forward direction, the lever is oscillated from the position shown in Fig. 2 to the position wherein the arm E enters the recess I and the arm D clears the recess H; then the lever may be oscillated in the limits of the slot just as before, and by bringing the arm D to position 2 an intermediate speed will be obtained; while in position 3 at the other end of the slot the high speed will result. It will be seen that there can be no interference between the mechanisms controlled by the arms D and E, since in each case the one arm is locked in the neutral or inoperative position when the other arm is either in a working position or in some position intermediate the working and neutral positions.

In Figs. 1 and 4 I have indicated a very satisfactory method of applying the controller to an automobile; thus L indicates the frame of the automobile upon which the body and the propelling motor are supported. The body M is mounted upon the rear portion of the frame and does not extend entirely to the front thereof. On the front end of the frame is the usual dash, which is secured in place by means of a bracket N, which is in turn fastened to the frame. The front end of the body portion and the rear end of the member N are left sufficiently far apart to admit the bracket C, so that when the bracket is secured to the frame it is braced at the sides by means of the body of the automobile and the member N. Furthermore, the heights of the meeting portions of the members M, C and N are made such that a smooth and continuous contour is given to the whole.

I claim:

1. In combination, a pair of movable elements, mounted so as to be revoluble independently of each other and movable within predetermined limits in unison with each other in the axial direction, an operating member therefor having main and auxiliary paths of movement, a fixed support, and means associated with said member and controlled by movements thereof in said auxiliary path for connecting either of said elements to the member so as to be operated thereby when the member is actuated in the main path and at the same time locking the other element to said fixed support so as to hold it against movement, the selection of said elements being determined by the direction in which the member is actuated in said auxiliary path.

2. In combination, a pair of movable elements, mounted so as to be revoluble independently of each other and movable within predetermined limits in unison with each other in the axial direction, an operating lever therefor mounted for movements in a main path and in an auxiliary path at right angles to the plane of the main path, a fixed support, and means associated with said lever and controlled by movements of said lever in said auxiliary path for connecting either of said elements to the lever so as to be operated thereby when the lever is actuated in the main path and at the same time locking the other element to said fixed support so as to hold it against movement, the selection of said elements being determined by the direction in which the lever is moved in said auxiliary path with reference to the plane of said main path.

3. In combination, a pair of movable elements, mounted so as to be revoluble independently of each other and movable within predetermined limits in unison with each other in the axial direction, an operating lever therefor mounted for oscillation in main and auxiliary paths arranged at an angle to each other, a fixed support, and means associated with said lever and controlled by the oscillation thereof in said auxiliary path for connecting either of said elements to the lever so as to be actuated thereby when the lever is oscillated in the main path and at the same time locking the other element to said fixed support so as to hold it against movement, the selection of said elements being determined by the direction in which said lever is oscillated in said auxiliary path.

4. In combination, a pair of revoluble shafts, mounted so as to be revoluble independently of each other and movable within predetermined limits in unison with each other in the axial direction, an operating lever mounted adjacent said shafts for main and auxiliary oscillating movements respectively in a plane transverse to the axis of the shafts and in a plane parallel to the shafts, a fixed support and means associated with said lever and controlled by oscillating movements thereof in said auxiliary path for connecting either of said shafts to the lever so as to be rotated thereby when the lever is actuated in said main path and at the same time locking the other shaft to said fixed support, so as to hold it against rotation, the selection of said shafts being determined by the direction of the movement of said lever in said auxiliary path.

5. In combination, a pair of telescoped revoluble shafts, mounted so as to be revoluble independently of each other and movable within predetermined limits in unison with each other in the axial direction, an operating lever arranged adjacent said shafts and supported for main and auxiliary oscillatory movements respectively in a plane transverse to the axis of said shaft and in a plane at right angles to the latter plane, a fixed support and means associated with said shafts and said lever and controlled by oscillatory movements of the lever in said auxiliary path for connecting either of said shafts to said lever so as to be rotated thereby when the lever is oscillated in said main path and at the same time locking the other shaft to said fixed support so as to hold it against rotation, the selection of said shafts being determined by the direction of movement of said lever in said auxiliary path.

6. In combination, a pair of shafts mounted so as to be capable of independent revoluble movements and reciprocating movements in unison with each other in the axial direction, an arm projecting laterally from each of said shafts, an operating lever arranged between and adapted to engage with said arms, said lever being mounted for movements parallel with and at right angles to said shafts, fixed guides between which said arms travel during rotation of the shafts, the distance between said guides being less than the distance between the outer surfaces of the arms measured in the direction parallel with the shafts and at least as great as the combined thicknesses of one arm and of the lever, said guides being provided with alined recesses opening into the space between the guides and of such size as to be capable of receiving and holding an arm, and means for locking either of said arms to said lever when the other arm is moved into the corresponding recess.

7. In combination, a pair of telescoped shafts mounted so as to be capable of independent revoluble movements and reciprocating movements in unison with each other in the axial direction, a laterally-extending projection on each of said shafts, an operating lever arranged between and engaging said projections, said lever being supported for main and auxiliary oscillatory movements in planes respectively at right angles to and parallel to the axis of said shafts, fixed guides between which said projections extend, the distance between said guides being less than the distance between the outer surfaces of the projections measured in the axial direction and at least as great as the combined thicknesses of either projection and of the lever, said guides having alined recesses in opposite sides thereof of a size to receive and hold a projection, and means for locking either of said projections to the lever when the other is moved into one of said recesses.

8. In combination, a pair of arms mounted so as to be capable of independent rotation and reciprocatory movements in unison in the axial direction, an operating member extending between said arms, said member being mounted for movements in planes respectively parallel with and at right angles to the axis of rotation of said arms, guides between which said arms travel, the distance between said guides being less than the distance across said arms and at least equal to the combined thickness of one arm and of the operating member, said guides being provided in opposite sides thereof with alined recesses of a size to receive and hold one of said arms, and means for locking either of said arms to the said operating member when the other arm is moved into the corresponding recess.

9. In combination, a pair of arms mounted so as to be capable of independent rotation and of reciprocatory movements in unison in the axial direction, an operating member extending between said arms, said member being mounted for movements in planes respectively parallel with and at right angles to the axis of rotation of said arms, guides between which said arms travel, the distance between said guides being less than the distance across said arms and at least equal to the combined thickness of an arm and of said operating member, said guides being provided in opposite sides thereof with alined recesses of such size as to be capable of receiving and holding an arm, a movable dog arranged transversely of said member between the guides and having a length greater than the difference between the thickness of an arm and the distance between said guides, and each of said arms having a dog-receiving slot so situated that when an arm is in the recess in one of the guides the slot in the other arm is opposite an unrecessed portion of the latter guide.

10. In combination, a pair of arms mounted so as to be capable of independent revoluble movements and movement in unison in the axial direction, an operating member extending between said arms, said member being mounted for movements in a plane transverse to the axis of rotation of said arms and also transversely to said plane, guides between which said arms are adapted to travel, the distance between said guides being less than the distance across said arms and at least as great as the combined thicknesses of an arm and of the operating member, said guides having in opposite sides thereof alined recesses of such size as to be capable of receiving and holding an arm, each of said arms having a slot and each of said guides having a projection within the recess therein adapted to enter the slot in the corresponding arm when the arm is introduced into the recess, and a movable dog arranged transversely of the operating member and having its ends formed so as to fit the slots in the arms, said dog having a length greater than the difference between the thickness of an arm and the distance between said guides.

11. In combination, a pair of arms mounted so as to be capable of independent rotation and of reciprocatory movements in unison in the axial direction, an operating lever pivotally supported at one side of the axis of rotation of said arms for oscillation in a plane at right angles to said axis, said lever extending between and being adapted to engage with said arms in the opposite side of said axis, means for permitting oscillatory movements of the lever transversely to said plane, guides between which said arms travel, the distance between said guides being less than the distance across said arms and at least as great as the combined thicknesses of an arm and of the lever, said guides having in opposite sides thereof and intermediate their ends alined recesses of such size as to be capable of receiving and holding an arm, and means for locking either arm to the lever when the other arm is moved into the recess.

12. In combination, a pair of shafts mounted so as to be capable of independent revoluble movements and of reciprocatory movements in unison with each other in the axial direction, an arm rigidly connected to each of said shafts and projecting laterally therefrom, a pair of guides between which said arms are adapted to travel, an operating lever pivotally supported adjacent the shafts on the side of the axis opposite the arms for oscillatory movement in a plane at right angles to the axis and extending between and engaging with said arms, means for permitting oscillatory movements of the lever transversely to said plane, and means controlled by oscillatory movements of the latter type for locking either of said arms to one of the guides and at the same time locking the other arm to the lever so as to cause the rotation of the corresponding shaft upon rotation of the lever in the plane at right angles to the axis of the shafts.

13. In combination, a bracket, a pair of telescoped tubes capable of independent rotary movement revolubly mounted in said bracket with freedom for reciprocation in the axial direction, shoulders on said shaft for preventing relative axial movements, an arm rigidly connected to each of said shafts and projecting laterally therefrom, guides on said bracket between which said arms are adapted to travel, an operating lever pivotally supported for oscillation in a plane at right angles to the shafts on the side of the shafts opposite that to which the arms are situated, said lever extending between and being adapted to engage with said arms, means for permitting slight oscillatory movements of said lever transversely of said plane, and means controlled by lever movements of the latter type for locking either arm to the bracket and the other arm to the lever for movement therewith in said plane, the selection of said arms being determined by the direction of movement of said lever.

In testimony whereof, I sign this specification in the presence of two witnesses.

ROBERT SYMMONDS, JR.

Witnesses:
 ED. DIXON,
 H. LUTHI.